US012715151B1

(12) United States Patent
Nardi

(10) Patent No.: US 12,715,151 B1
(45) Date of Patent: Aug. 25, 2026

(54) HAIR CLIPPER CLEANING STATION

(71) Applicant: Leonardi Nardi, Boca Raton, FL (US)

(72) Inventor: Leonardi Nardi, Boca Raton, FL (US)

( * ) Notice: Subject to any disclaimer, the term of this patent is extended or adjusted under 35 U.S.C. 154(b) by 0 days.

(21) Appl. No.: 19/309,829

(22) Filed: Aug. 26, 2025

(51) Int. Cl.
*B26B 19/38* (2006.01)
*A45D 27/46* (2006.01)

(52) U.S. Cl.
CPC .......... *B26B 19/3833* (2013.01); *A45D 27/46* (2013.01)

(58) Field of Classification Search
CPC .................................................. B26B 19/3833
See application file for complete search history.

(56) References Cited

U.S. PATENT DOCUMENTS

| | | | | |
|---|---|---|---|---|
| 1,189,118 A * | 6/1916 | Jonas et al. | B65D 83/10 | 106/14.11 |
| 1,850,524 A | 3/1932 | Whittaker | | |
| 2,027,899 A * | 1/1936 | Bruce | B65D 85/54 | 206/208 |
| 2,290,769 A | 7/1942 | Schriner | | |
| 2,457,500 A * | 12/1948 | Seandura | A61L 2/00 | 422/28 |
| 3,019,494 A * | 2/1962 | Horie | A61L 2/00 | 206/208 |
| 5,628,971 A * | 5/1997 | Norman | A61L 2/26 | 422/301 |
| 6,263,890 B1 | 7/2001 | Hoser | | |
| 7,143,517 B2 | 12/2006 | Kappes et al. | | |
| 7,487,786 B2 | 2/2009 | Hoser et al. | | |
| 7,858,027 B2 | 12/2010 | Trissel | | |
| 8,177,918 B2 | 5/2012 | Schmitt | | |
| 8,505,205 B2 | 8/2013 | Wevers et al. | | |
| 8,967,168 B1 * | 3/2015 | Gusanders | A61L 2/18 | 4/619 |
| 2003/0226581 A1 * | 12/2003 | Peele | A45D 27/46 | 134/201 |
| 2004/0154650 A1 | 8/2004 | Saito et al. | | |
| 2006/0053642 A1 * | 3/2006 | Kappes | A45D 27/46 | 30/537 |
| 2007/0258874 A1 | 11/2007 | Vuong | | |

FOREIGN PATENT DOCUMENTS

| | | | |
|---|---|---|---|
| DE | 19914094 | 12/2000 | |
| JP | 5078111 | 11/2012 | |
| WO | WO-2004086901 A1 * | 10/2004 | B26B 19/3833 |

* cited by examiner

*Primary Examiner* — Hwei-Siu C Payer
(74) *Attorney, Agent, or Firm* — The Concept Law Group, PA; Scott D. Smiley; Scott M. Garrett

(57) ABSTRACT

A hair clipper cleaning station includes a tank in which a clipper support structure in positioned. The clipper support structure includes a holder that slides up and down, at an angle, from an initial position to a cleaning position. When the tank is filled with cleaning solution to an indicated level, when the holder is in the initial position, a clipper placed on the holder will be out of the cleaning solution. When the holder is then moved into the cleaning position, the blade portion of the clipper will be immersed in the cleaning solution, but the remainer of the clipper will remain out of the cleaning solution.

9 Claims, 12 Drawing Sheets

HAIR CLIPPER CLEANING STATION

FIELD OF THE INVENTION

The present invention relates generally to hair stylist and barber tools, and, more particularly, relates to a cleaning station for cleaning electric hair clippers.

BACKGROUND OF THE INVENTION

Hair stylists and barbers use clippers for cutting and trimming hair, including facial hair. Over time, despite maintenance and cleaning between uses and between clients, there is a build-up of detritus and other material that periodically needs to be removed to keep the clippers hygienic and operating properly. To facilitate cleaning and sterilization of clipper blades and the guides adjacent the blade element there are a number of solutions in which the clipper blades can be immersed while the clipper is turned on, causing the blade to oscillate back and forth. As a result, dirt and debris can be loosened and expelled from the blade. A typical way of cleaning clippers is to take the lid off a container of cleaning solution, turn the lid upside down, and pour some of the cleaning solution into the lid of the cleaning solution container. Then the stylist/barber then puts the blade end of their clipper into the lid and turns on the clipper. Since the lid is shallow, it is easy to only fill it enough so that just the blades will be immersed in the cleaning solution. This prevents other parts of the clipper, that might be damaged by the cleaning solution, from being immersed in the cleaning solution.

However, this common method of cleaning results in a substantial amount of the cleaning fluid being splashed about the location. The remaining cleaning solution is then fouled to the point that it may need to be changed before cleaning another hair grooming appliance. Further, it requires someone to hold the clipper during the cleaning, and they may tip the clipper to a less than optimum angle.

Therefore, a need exists to overcome the problems with the prior art as discussed above.

SUMMARY OF THE INVENTION

In accordance with some embodiments of the inventive disclosure, there is provided a cleaning station for hair clippers that includes a tank configured to hold a volume of cleaning solution. There is also a cleaning support assembly disposed in the tank and having an upper support member including a planar main wall portion and a stop portion extending from a bottom of the main wall portion perpendicular to the main wall portion. There is further a holder that is engaged with the upper support member to move between an initial position and a cleaning position, the holder having a planar portion configured to slide along the main wall portion of the upper support member, and a holder stop portion that extends perpendicularly from a bottom of the planar portion which is configured to receive the blade portion of a clipper when the clipper is placed on the holder. In the initial portion the clipper is entirely out of the cleaning solution, and in the cleaning position the blade portion of the clipper is immersed in the cleaning solution and the holder stop portion bears against the stop portion of the upper support member.

In accordance with a further feature, the stop portion includes at least one drainage opening through the stop portion.

In accordance with a further feature, the stop portion includes a slot through which the blade portion of the clipper can extend.

In accordance with a further feature, there is further included a trap proximate to a bottom of the tank such that there is a space between the trap and the bottom of the tank.

In accordance with a further feature, the trap comprises a plurality of through slots separated by peaks.

In accordance with a further feature, the cleaning support assembly includes a pair of guides between which the holder is positioned, and wherein the holder comprises rails that fit into the guides.

In accordance with a further feature, there is further included a spring positioned in each of the guides the biases the holder to the initial position from the cleaning position.

In accordance with a further feature, the holder is at an angle of between fifteen and forty degrees to vertical.

In accordance with a further feature, there is further included a cover that fits over a top of the tank, and includes an opening configured to allow insertion of the clipper therethrough into the holder. Although the invention is illustrated and described herein as embodied in a hair clipper cleaning station, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the article being referenced. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1A:
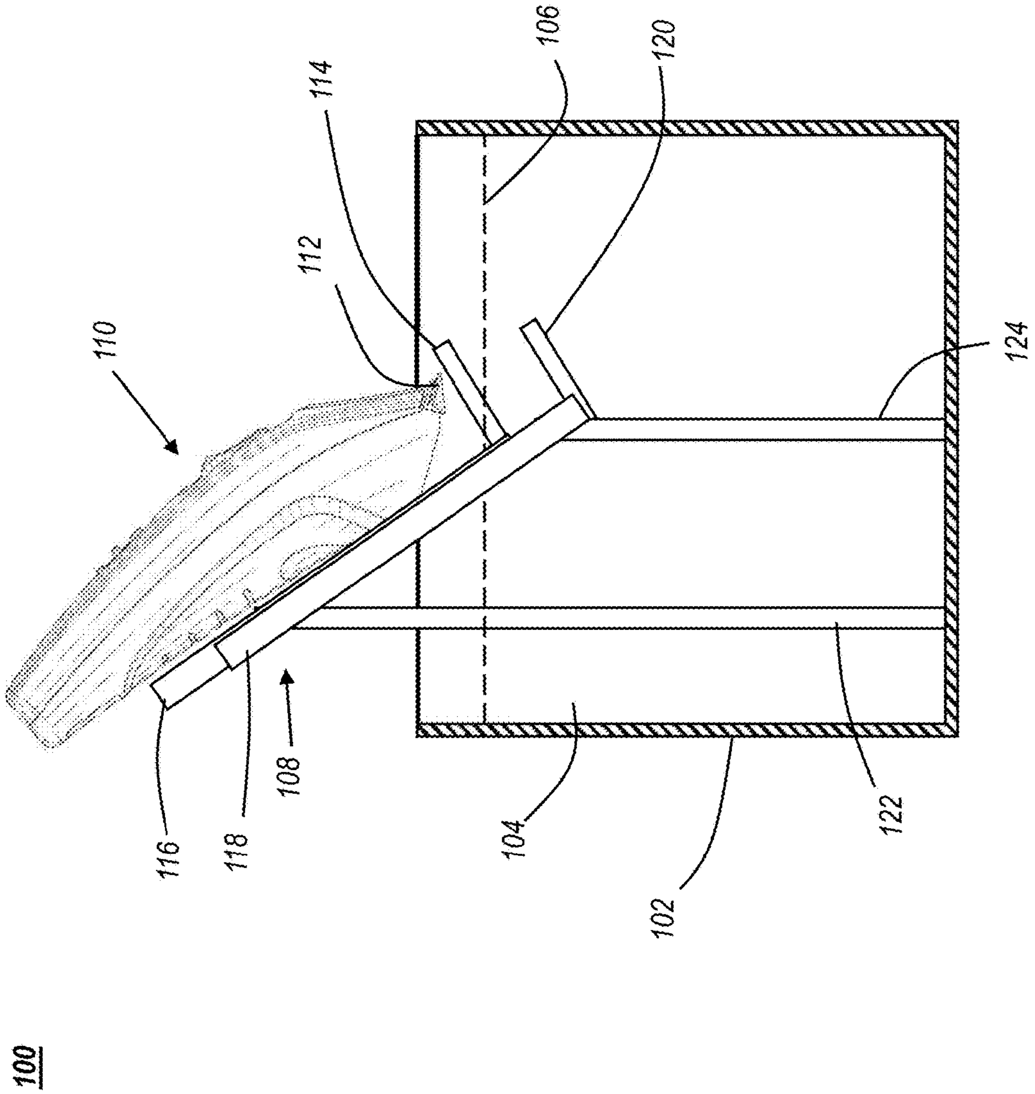
FIG. 1A shows a side view of a hair clipper cleaning station, in which the tank is shown in cutaway along a central vertical section, and in which the hair clippers are in an initial position, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 1B:
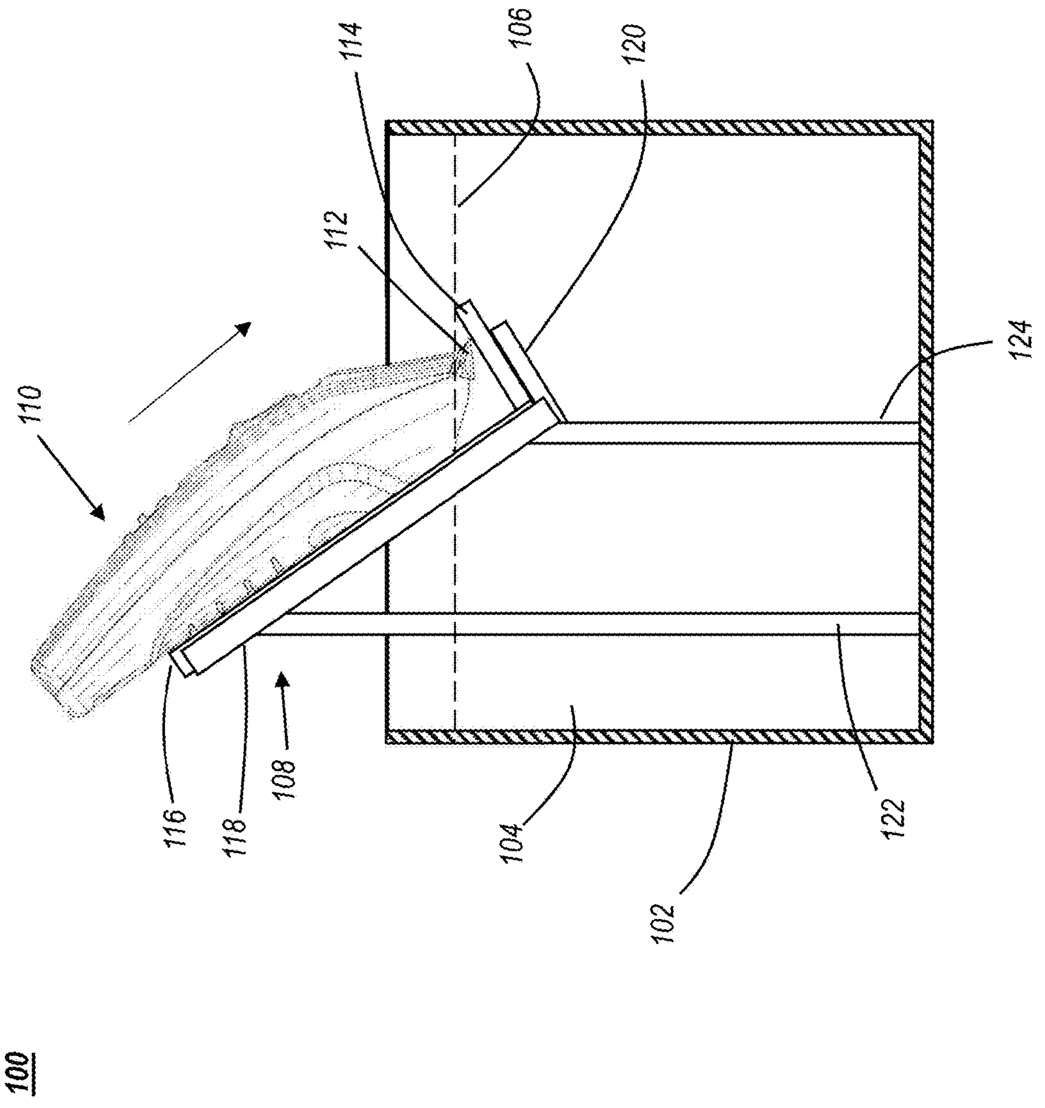
FIG. 1B shows a side view of a hair clipper cleaning station, in which the tank is shown in cutaway along a central vertical section, and in which the hair clippers are in a cleaning position, in accordance with some embodiments.

FIG. 1A shows a side view of a hair clipper cleaning station 100, in which a tank 102 is shown in cutaway along a central vertical section, and in which the hair clippers 110 are in an initial position, in accordance with some embodiments. FIG. 1B shows the same view with the hair clippers 110 and the holder 116 in the cleaning position. The tank 102 holds a volume of cleaning solution, and is filled to a level 106 corresponding to an indicating line on the side of the tank 102. The cleaning solution can be, for example, similar to that sold under the trade name BLADE CARE PLUS by the Andis company. A support assembly 108 is placed in the tank 102 in the cleaning solution. A clipper holder 116 is disposed in an upper support member 118, which is tilted at an angle to ensure the hair clipper 110 does not fall forward, out of the cleaning station 100, and can be between fifteen and forty degrees from vertical. The upper support member 118 is supported by leg members 122, 124 and includes a stop or stop portion 120 at the bottom of the upper support member 118. In general, the upper support member 118 presents a planar front surface on which the holder 116 can slide between the initial position as in FIG. 1A and the cleaning position as in FIG. 1B. The holder 116 and the upper support member 118 have intercoupling portions that guide the holder 116 along the surface of the upper support member 118. The upper support member 118 has a stop 120 the stops the movement of the holder at the optimum height, or depth into the tank 102, assuming the cleaning solution level is also at the correct level, for the blade portion 112 of the clipper 110 to be immersed in the cleaning solution when the holder 116 is in the cleaning position. In the cleaning position, only the blade portion 112 of the clipper 110 will be immersed in the cleaning solution, again, assuming the cleaning solution is at the correct level in the tank 102. Once the blade portion 112 is immersed, the user can turn on the clipper to cause the blade to oscillate while immersed, which works to expel debris and dirt from the blade portion 112. The level of the cleaning solution can be set at a level such that the outer wall of the tank 102 rises above the surface of the cleaning solution sufficiently to block splashed cleaning solution from exiting the tank 102. The holder 116 can be urged into the initial position by a spring or springs so that when the clipper 110 is placed on the holder 116, the user must push the clipper and holder downward until the holder 116 is stopped by the stop portion 120. In some embodiments there can be a latching mechanism to hold the holder in the cleaning position while the clipper is running, so that the user does not have to hold the holder and clipper down during the cleaning process. In some embodiments, the spring tension can be enough raise the holder 116 when the clipper 110 is not on the holder 116, but the weight of the clipper 110 will overcome the spring tension and cause the holder 116 to slide downward so that the blade portion 112 of the clipper 110 is immersed in the cleaning solution.

Figure 2B:
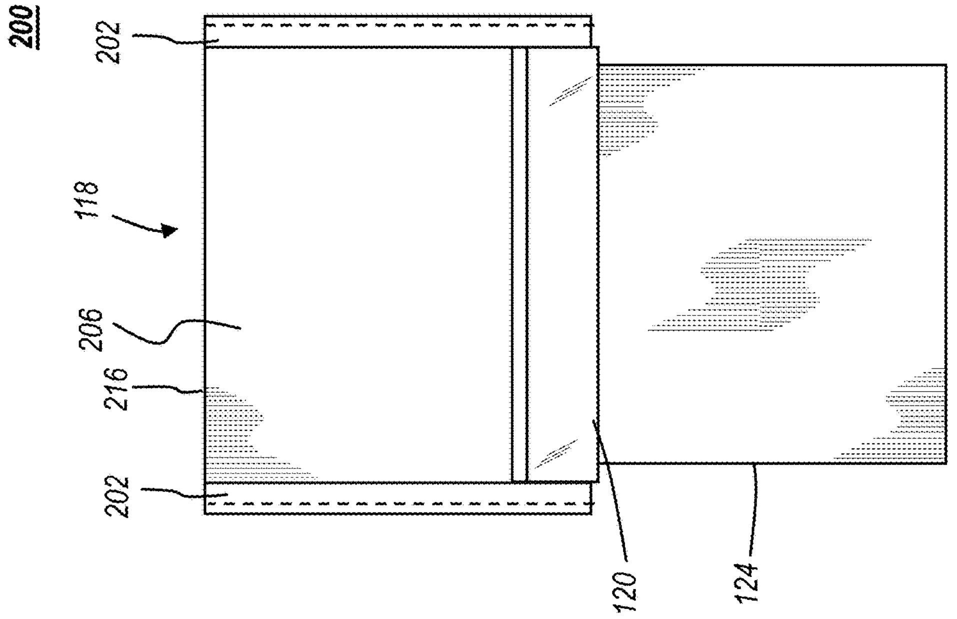
FIG. 2B shows a front elevational view of a cleaning station support assembly, in accordance with some embodiments.
Figure 2A:
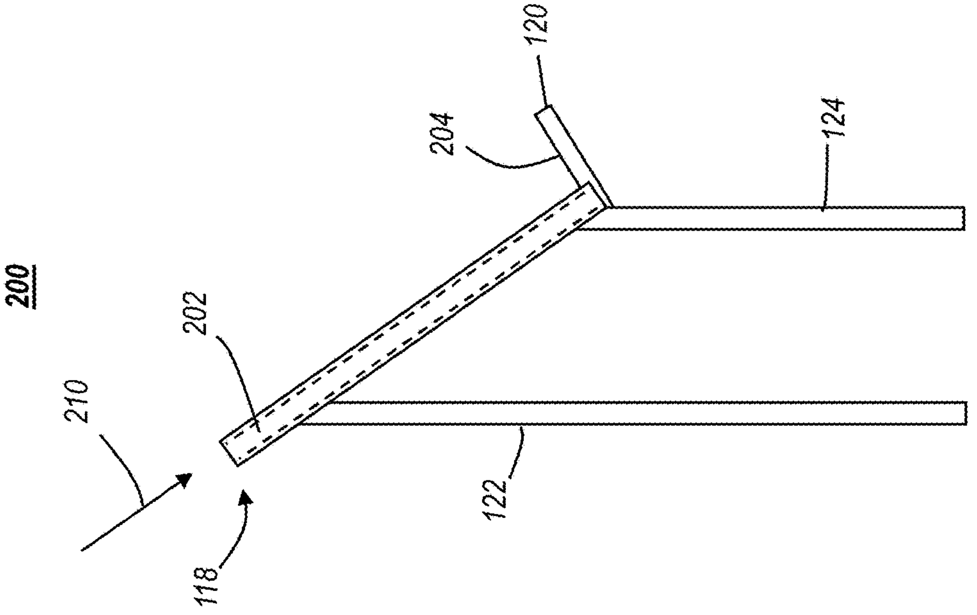
FIG. 2A shows a side elevational view of a cleaning station support assembly, in accordance with some embodiments.
Figure 2C:
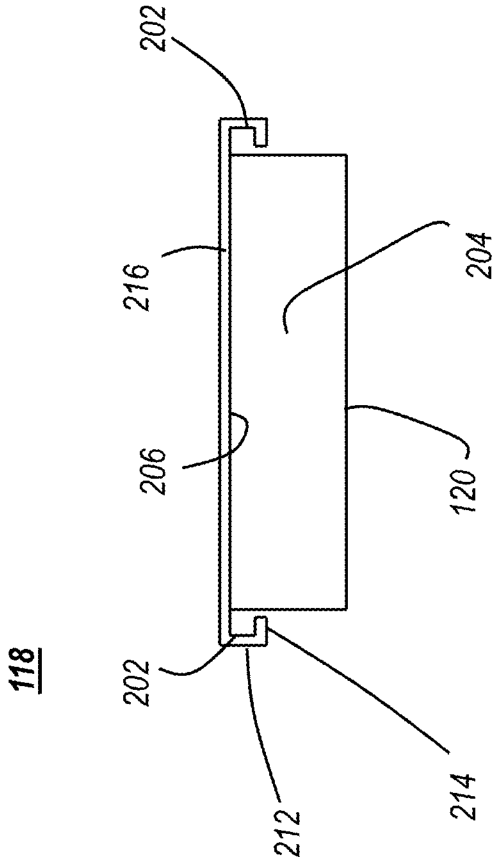
FIG. 2C shows a top plan view of the upper support member, in accordance with some embodiments.

FIGS. 2A and 2B show a side elevational view and a front elevational view, respectively, of the cleaning station support assembly 200, in accordance with some embodiments. FIG. 2C shows a plan view of the upper support member 118 without the leg member 122, 124 in view, and looking the direction of arrow 210. The upper support member 118 can be seen to be a flat, planar member having a front surface 206 along which the holder 116 can slide. Along the opposite sides of the upper support member 118 are "C" shaped guides 202. Each of the guides 202 has a wall portion 212 that extends forward perpendicularly from the plane of the front surface 206 at the side/edge of the front surface 206. At the distal end of the perpendicular wall portion 212 is an inward oriented portion 214 that is perpendicular to the wall portion 212. These portions extends a substantial distance along the edge at each side, from the top 216 of the upper support member 118 toward the stop portion 120. The stop portion 120 has an upper surface 204 against which the holder 116 contacts and stops the holder 116 from going deeper into the cleaning solution. The front and rear leg members 124, 122, respectively, support the upper support member in the tank 102. The height of the leg members 122, 124 are selected to allow an ample volume of cleaning solution in the tank 102, as well as to assure the blade portion of the clipper will be immersed in the cleaning solution, and the rest of the clipper will be out of the cleaning solution. One of the problems with using the lid method of cleaning is that, in addition to the splashing, the amount of cleaning solution used in the lid is disposed of after one or two uses. Conversely, the tank 102 can hold a much larger volume of cleaning solution, which can be used for many uses, and as a result, the cleaning station 100 can be ready to use any time.

Figure 3B:
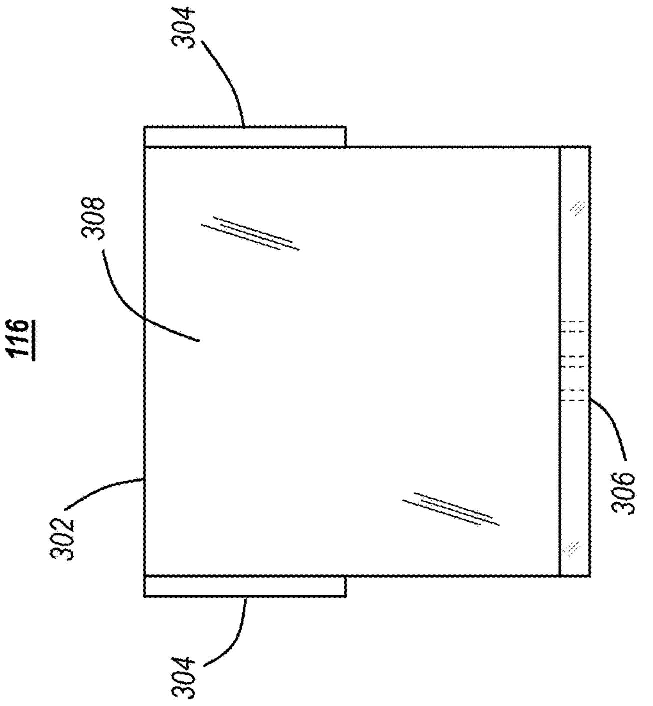
FIG. 3B shows a front elevational view of a clipper holder for a hair clipper cleaning station, in accordance with some embodiments.
Figure 3C:
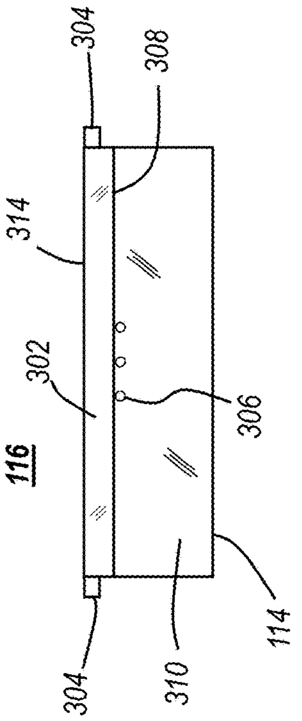
FIG. 3C shows a top plan view of a clipper holder for a hair clipper cleaning station, in accordance with some embodiments.
Figure 3A:
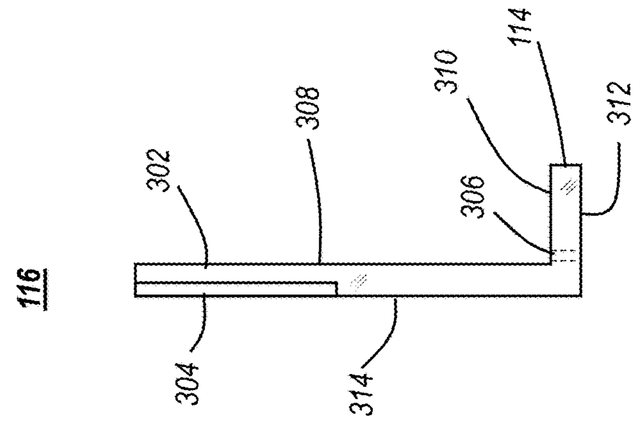
FIG. 3A shows a side elevational view of a clipper holder for a hair clipper cleaning station, in accordance with some embodiments.

FIGS. 3A-3C show a side elevational view, front elevational view, and top plan view, respectively, of a clipper holder 116 for a hair clipper cleaning station, in accordance with some embodiments. The holder has a main wall portion 302 that is planar and is configured to rest against the front surface 206 of the upper support member 118 where the back surface 314 will be in contact with the front surface 206 of the upper support member 118. The hair clipper 110 will rest against the front surface 308 of the main wall portion 302, and the tip of the blade portion 112 of the hair clipper 110 will rest against the holder stop portion 114, which extends perpendicularly from the bottom of the main wall portion 302. Specifically, the blade portion 112 will rest against the top surface 310 of the holder stop portion 114, and the lower or bottom surface 312 of the holder stop portion 114 will rest against the top surface 204 of the stop portion 120 of the upper support member 118 when the holder 116 is moved downward fully (i.e. in the direction of arrow 210). The holder stop portion 114 can have one or more openings 306 located adjacent the front surface 308 of the main wall portion 302 to allow cleaning solution to drain off of the holder 116 and back into the tank 102 when the holder 116 is moved back into the initial position (i.e. as in FIG. 1) from the cleaning position.

At the opposite narrow sides of the main wall portion 302 are rails 304 that are configured to fit into the guides 202 of the upper support member 118, and thereby restrict movement of the holder 116 along the front surface 206 of the upper support member 118 between the initial and cleaning positions. The rails 304 are sized so that the holder 116 can move along the direction of arrow 210 relatively freely, but which also prevent disengagement of the holder 116 from the upper support member 118 to the sides or outward.

Figure 4:
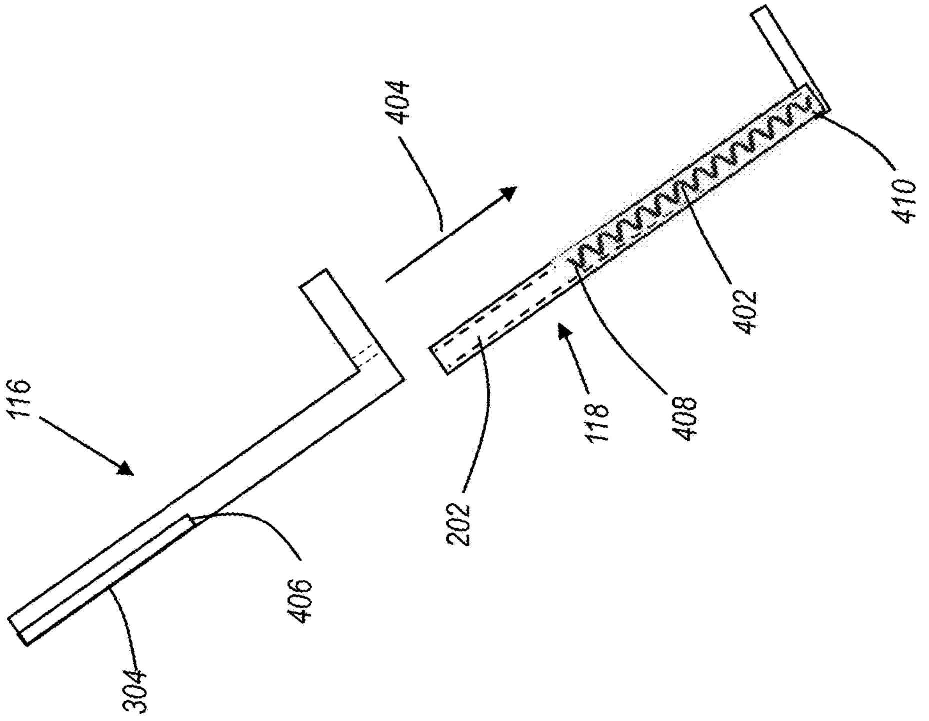
FIG. 4 shows an assembly diagram for placing a clipper holder in a cleaning station support, in accordance with some embodiments.

FIG. 4 shows an assembly diagram for placing a clipper holder 116 in the upper support member 118 of a cleaning station support, in accordance with some embodiments. As described above, the rails 304 on the sides/edges of the holder 116 fit into the guides 202 of the upper support member 118. A spring 402 can be located in the bottom portion of at least one of the guides 202. The top end 408 of the spring 402 will bear against the bottom 406 of the rail 304, and the bottom end 410 of the spring 402 can be anchored in the guide 202. Further, the top end 408 of the spring 402 does not extend to the top of the guide 202, and can extend to about a halfway or mid-point between the top and bottom of the guide 202 so that the holder 116 will remain engaged with the upper support member when the holder is in the initial position. The holder 116 can be placed into engagement with the upper support member 118 by moving the holder 116 in the direction of the arrow 404. Once the holder 116 is in place, a hair clipper can be placed on holder with blade portion down, and then the holder can be pushed downward so that the blade portion is immersed in the cleaning solution in the tank 102. When the blade portion is then immersed in the cleaning solution, the clipper can be turned on to allow the blade to oscillate within the blade guide, which facilitates the expulsion of hair bits and other debris and cleans the blade through the anti-microbial action of the cleaning solution.

It will be appreciated by those skilled in the art that the holder 116 and upper support member 118 are shown tilted at an angle, such that their front surfaces face partly in the vertical direction as well as in the horizontal direction. This is to allow the hair clipper 110 to rest on the front surface 308 of the holder without the hair clipper 110 falling forward. However, the front surface 308 of the holder 116 could be oriented completely vertically if there is some support structure in place to prevent the hair clipper 110 from falling forward off the holder. Likewise, the leg members 122, 124 do not have to be wall-like members and can instead be posts or other columnar members, so long as they adequately support the upper support member 118. Further, it will be understood that the cleaning station support, including the upper support member 118 and the holder 116, do not need to be attached to the side wall of the tank 102. The tank 102 can be any reservoir capable of holding a sufficient amount of cleaning solution to allow numerous cleanings of hair clippers without having to replace or change the cleaning solution. The depth of the tank 102, relative to the blade portion of the hair clipper when the blade portion (alone) is immersed in the cleaning solution should be sufficient to allow hair bits and other debris expelled from the clipper during cleaning to settle at the bottom of the tank 102 and not be disturbed by subsequent cleanings. One issue with using the cleaning solution jar lid for cleaning is that the debris expelled from the blade portion remains at the same level as the blade portion because the lid is filled with just enough cleaning solution to cover the blade portion. As a result, the number of cleanings that can be performed with a given volume of cleaning solution using the lid method is limited. Using a tank that allows settling of the expelled debris allow many more cleanings per unit volume of cleaning solution.

Figure 6:
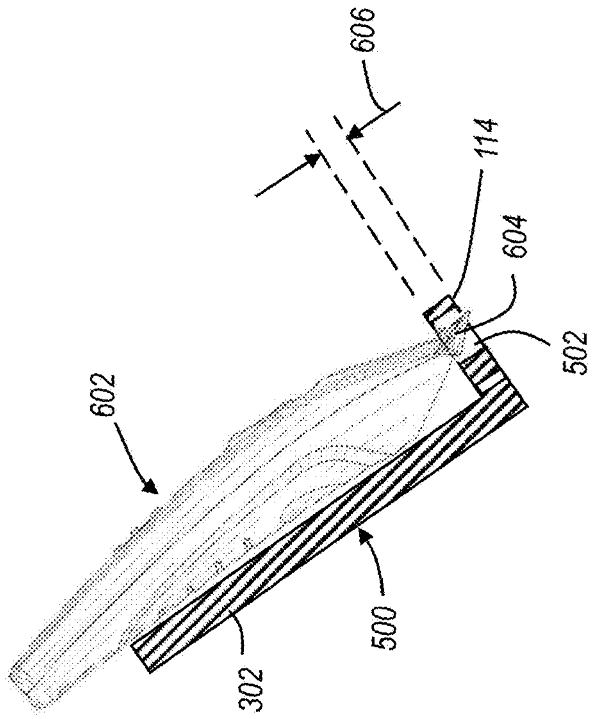
FIG. 6 shows a side view of a clipper holder having a blade slot opening in cut-away along a central vertical section line, in accordance with some embodiments.
Figure 5:
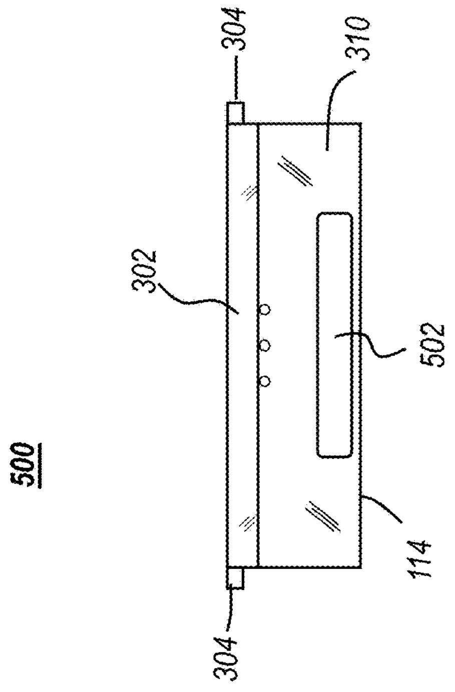
FIG. 5 shows a top plan view of the clipper holder having a blade slot opening, in accordance with some embodiments.

FIGS. 5 and 6 show a top plan view and a side view of a clipper holder 500 having a blade slot opening 502, in accordance with some embodiments. In particular, the holder 500 is substantially similar to holder 116 with the addition of a blade slot opening 502 through the holder stop portion 114. The slot opening size and position on the holder stop portion 114 are selected so that the blade portion 604 of a hair clipper 602 fit within the slot opening, and the edges of the slot opening 502 bear against the hair clipper 602 at locations around the blade portion 604 to hold the hair clipper 602 in place and prevent the blade portion 604 from extending past the bottom of the holder stop portion 114. This means that the thickness or height 606 of the holder stop portion must be at least as high as the blade portion 604 in the same direction, when the clipper 602 is mounted on the holder 500. The slot opening allows for some reverberation of the vibrations created by the oscillation of the blade during the cleaning process, and helps to expel hair bits and other debris. It will be appreciated that the stop portion 120 of the upper support member should not cover the bottom of the slot opening in order to allow for the expelled debris to drift away from the blade portion during cleaning. Because there are numerous configurations and geometries of various clippers on the market, there can be several different holders 500 that have differently sized and positioned slot openings 502 while the main holder portion 302 and rails 304 are the same size on all of the holders 500 to fit in the upper support member 118. Thus, and clipper cleaning station can have one tank, one cleaning station support, and several different holders that all fit into the same upper support member to accommodate a wide variety of different clippers. Because the geometry of the blade portion of different clippers can vary, the height 606 of the holder stop portion 114 can vary accordingly to best suit particular clippers and ensure that the blade portion is adequately surrounded by the rigid material of the holder stop portion 114 for the reflected vibrations to act on the blade portion.

Figure 8:
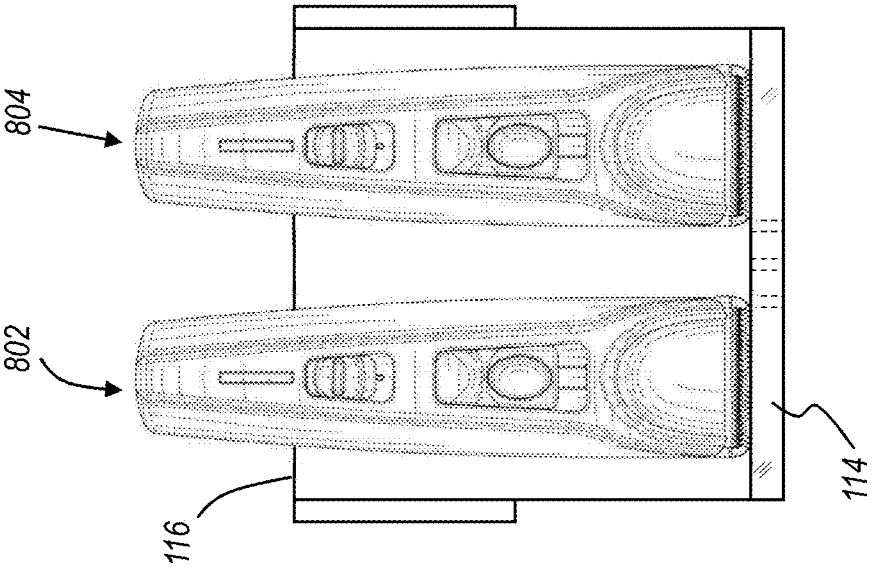
FIG. 8 shows a front elevation a view of a clipper holder with a pair of hair clippers resting thereon, in accordance with some embodiments.
Figure 7:
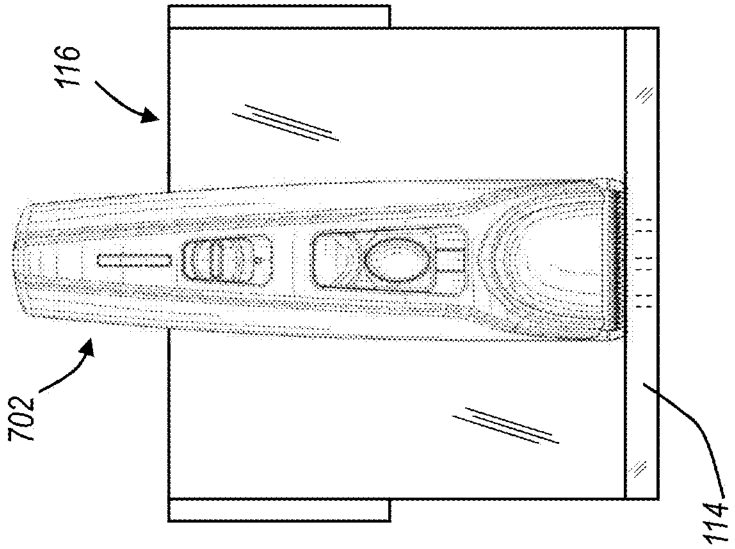
FIG. 7 shows a front elevation a view of a clipper holder with a hair clipper resting thereon, in accordance with some embodiments.

FIG. 7 shows a front elevation a view of a clipper holder 116 with a single hair clipper 700 resting thereon, in accordance with some embodiments. The clipper 700 can be substantially similar to clipper 110 or clipper 602. As can be seen in FIG. 8, the holder stop portion 114 can be wide enough to accommodate two clippers 802, 804, which can also be substantially similar to clipper 110, and clipper 602, as well as clipper 702. The width of the holder stop portion, as well as the size of the tank 102 is thus such that multiple clippers can be cleaned at the same time.

Figure 9:
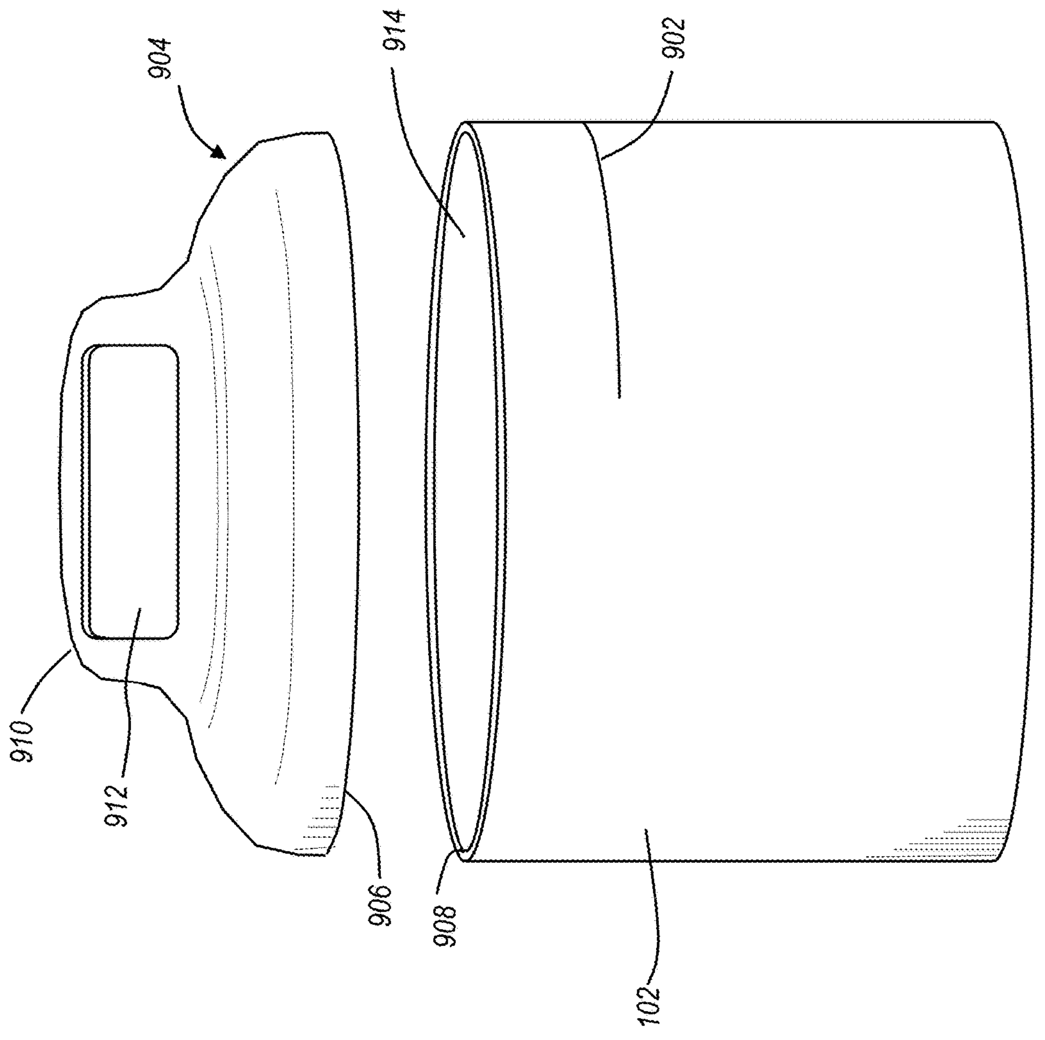
FIG. 9 shows a rear side perspective view of a hair clipper cleaning station tank and cover, in accordance with some embodiments.
Figure 10:
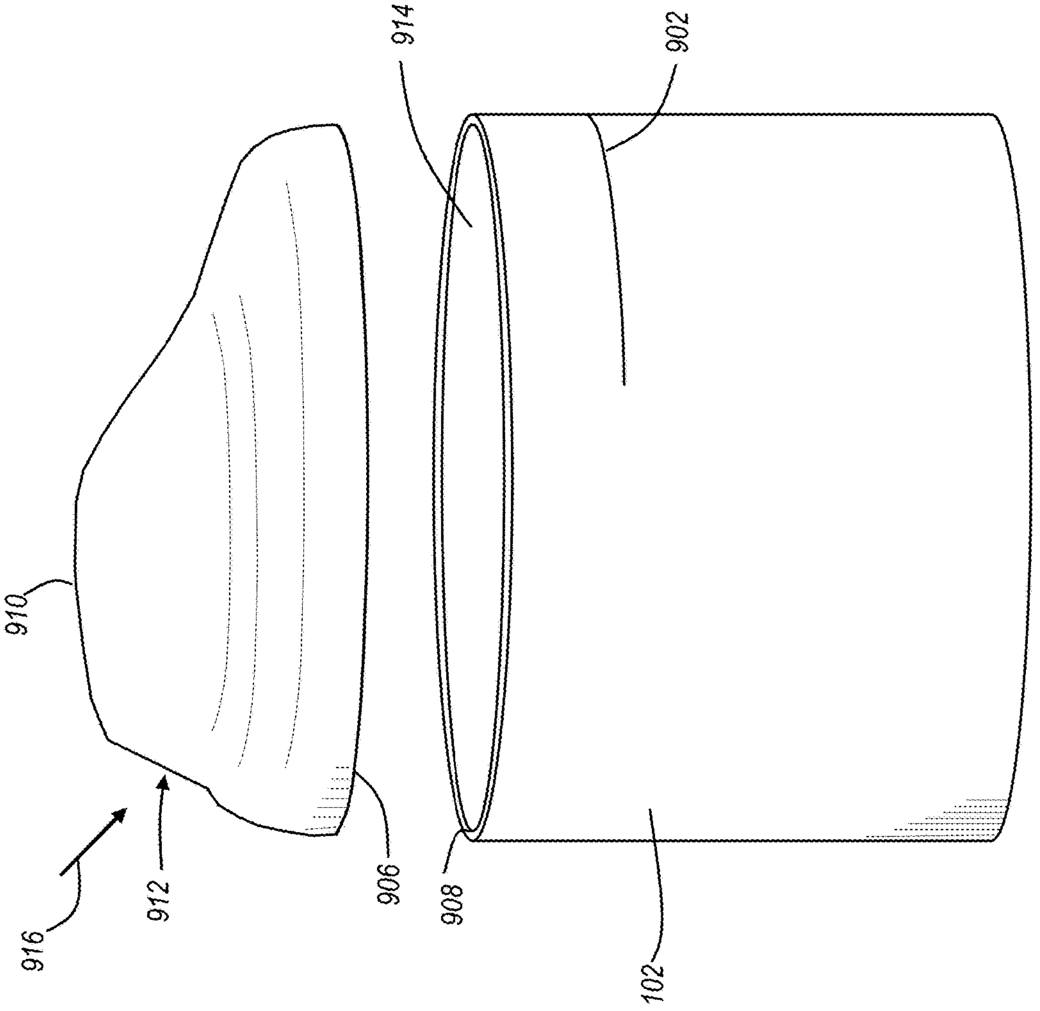
FIG. 10 shows a right-side perspective view of a hair clipper cleaning station tank and cover, in accordance with some embodiments.
Figure 11:
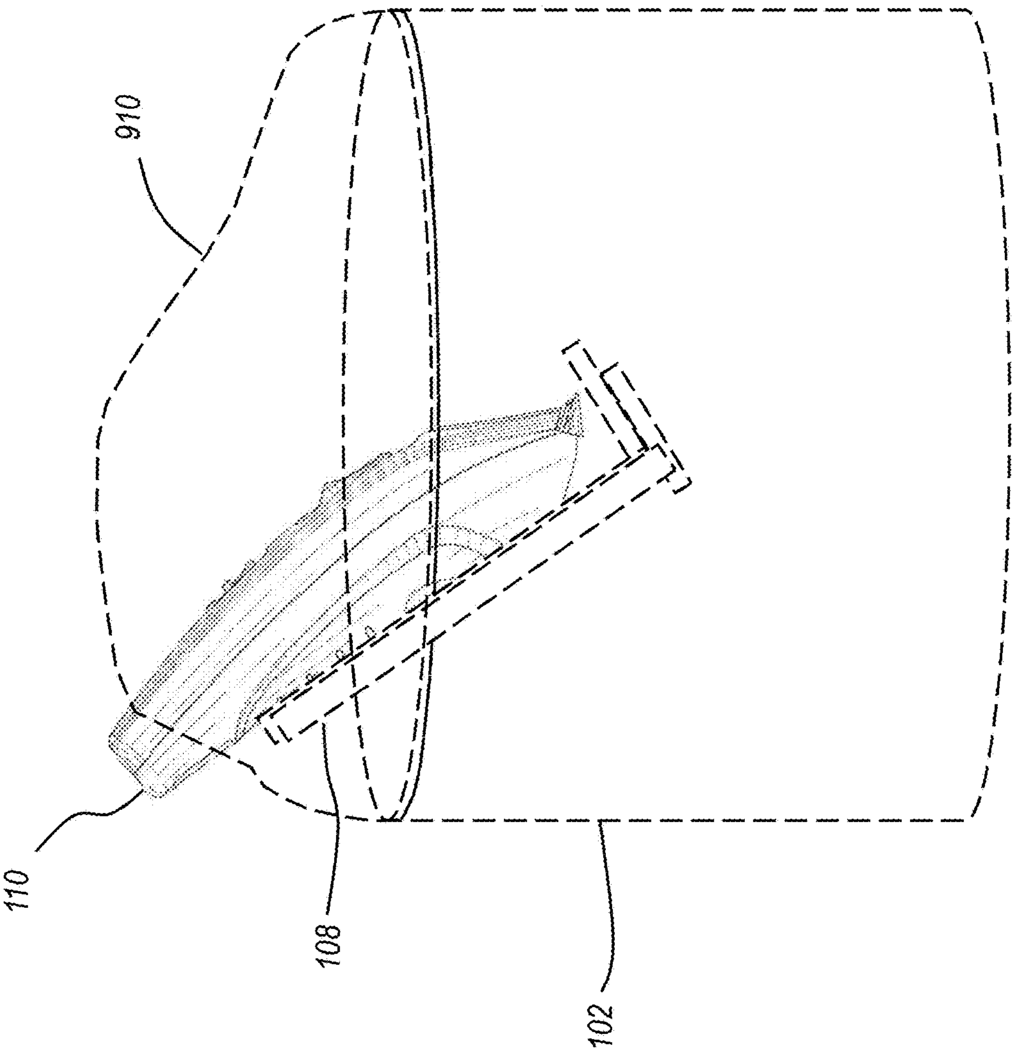
FIG. 11 shows a side view of the hair clipper cleaning station tank and cover with a clipper placed through the opening in the cover, in accordance with some embodiments.

FIGS. 9 and 10 show a rear side perspective view and a right-side perspective view of a hair clipper cleaning station tank 102 and cover 904, in accordance with some embodiments. The tank 102 defines a volume 914 in which the cleaning station support assembly 200 and cleaning solution are placed. The tank 102 can have a level line 902 on the outside (if transparent) or on the inside, or both, to indicate the level to which the tank is to be filled with cleaning solution. A bottom 906 of the cover 904 fits over the top 908 of the tank 102 such that the cover 904 remains in place during cleaning operations. The cover 904 has an opening 912 through which clippers can be placed into the holder 116 inside the tank 102. The cover has a top 910 which extends over the volume 914 of the tank. With the cover in place there is even less chance of cleaning solution exiting the tank due to splash, and the opening 912 allows the cover to remain in place until the cleaning solution needs to be changed. FIG. 11 shows a side view of the hair clipper cleaning station tank 102 and cover 910 with a clipper 110 placed through the opening in the cover, in accordance with some embodiments. The tank 102 and cover 910 are shown in dashed line to allow view of the clipper 110. The support structure 108 is also shown, supporting the clipper 110.

Figure 12:
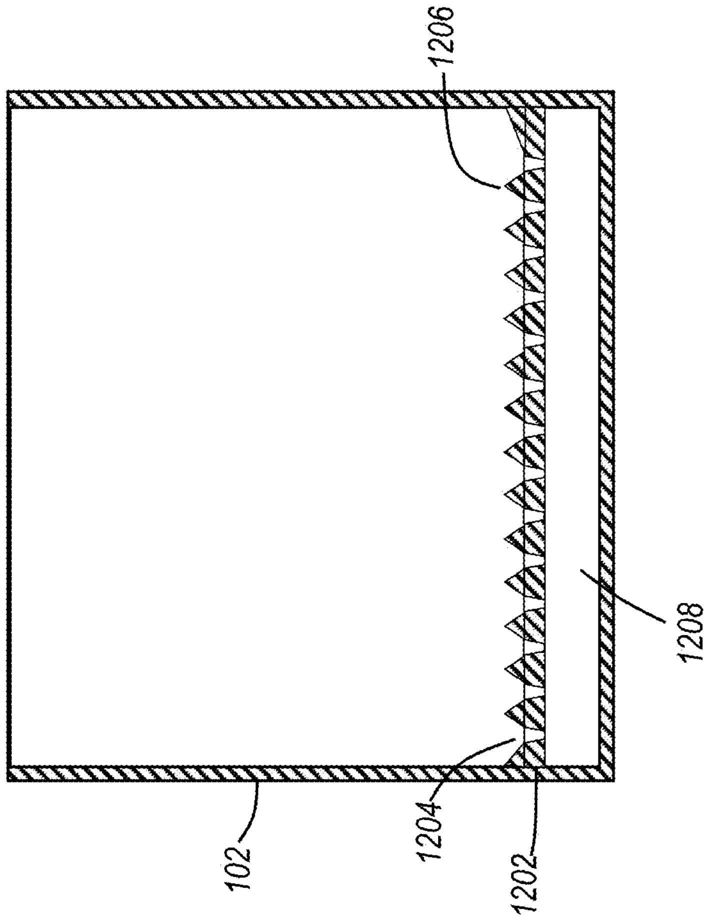
FIG. 12 shows a side sectional view of a tank having a debris trap proximate to the bottom of the tank, in accordance with some embodiments.

FIG. 12 shows a side sectional view of a tank 102 having a debris trap 1202 proximate to the bottom of the tank 102, in accordance with some embodiments. The trap 1202 sits in the tank 102 near the bottom of the tank, but spaced apart from the bottom to create a space 1208 between the trap 1202 and the bottom of the tank. The trap comprises a plurality of slots 1204 through which debris can fall. Between the slots 1204 there are peaks [106] 1206 that direct the debris into one of the adjacent slots 1204. From each peak 1206 the trap angles downward to the slot 1204 through the trap 1202. As debris is introduced into the cleaning solution, it drifts downward, passing through one of the slots 1204, and being retained in the space 1208 during subsequent cleanings. The trap 1202 serves to retain the debris under the trap 1202 when the tank 102 is moved, too. Thus, when the tank is taken out from storage for use, any debris under the trap 1202 won't be stirred up into the cleaning solution where the clipper blades are immersed for cleaning.

The disclosed hair clipper cleaning station allows routine cleaning of electric clippers without creating splash that needs to then be cleaned up. It also allows the long term use of cleaning solution to minimize the waste and expense of replacing the cleaning solution every time it is used.

The claims appended hereto are meant to cover all modifications and changes within the scope and spirit of the present invention.

What is claimed is:

1. A cleaning station for hair clippers, comprising:

a tank configured to hold a volume of cleaning solution;

a cleaning support assembly disposed in the tank and having an upper support member including a planar main wall portion and a stop portion extending from a bottom of the main wall portion perpendicular to the main wall portion;

a holder that is engaged with the upper support member to move between an initial position and a cleaning position, the holder having a planar portion configured to slide along the main wall portion of the upper support member, and a holder stop portion that extends perpendicularly from a bottom of the planar portion which is configured to receive a blade portion of a clipper when the clipper is placed on the holder; and wherein in the initial position the clipper is entirely out of the cleaning solution, and in the cleaning position the blade portion of the clipper is immersed in the cleaning solution and the holder stop portion bears against the stop portion of the upper support member.

2. The cleaning station of claim 1, wherein the holder stop portion includes at least one drainage opening through the holder stop portion.

3. The cleaning station of claim 1, wherein the holder stop portion includes a slot through which the blade portion of the clipper can extend.

4. The cleaning station of claim 1, further comprising a trap proximate to a bottom of the tank such that there is a space between the trap and the bottom of the tank.

5. The cleaning station of claim 4, wherein the trap comprises a plurality of through slots separated by peaks.

6. The cleaning station of claim 1, wherein the cleaning support assembly includes a pair of guides between which the holder is positioned, and wherein the holder comprises rails that fit into the guides.

7. The cleaning station of claim 6, further comprising a spring positioned in each of the guides that biases the holder to the initial position from the cleaning position.

8. The cleaning station of claim 1, wherein the holder is at an angle of between fifteen and forty degrees to vertical.

9. The cleaning station of claim 1, further comprising a cover that fits over a top of the tank, and includes an opening configured to allow insertion of the clipper therethrough into the holder.

* * * * *